July 11, 1972 J. H. LESLIE ET AL Re. 27,427

FEED CHUTE BOOSTER FOR FLEXIBLE STRAP

Original Filed Feb. 19, 1968 3 Sheets-Sheet 1

INVENTORS
John H. Leslie
Otis E. Hubbard

BY Dressler, Goldsmith, Clement & Gordon

ATTORNEYS

FEED CHUTE BOOSTER FOR FLEXIBLE STRAP

Original Filed Feb. 19, 1968 3 Sheets-Sheet 2

FEED CHUTE BOOSTER FOR FLEXIBLE STRAP

Original Filed Feb. 19, 1968 3 Sheets-Sheet 3

INVENTORS
John H. Leslie
Otis E. Hubbard
BY Dressler, Goldsmith, Clement & Gordon
ATTORNEYS United States Patent Office Re. 27,427
Reissued July 11, 1972

27,427

FEED CHUTE BOOSTER FOR FLEXIBLE STRAP

John H. Leslie and Otis E. Hubbard, by Signode Corporation, Chicago, Ill., assignee Original No. 3,468,241, dated Sept. 23, 1969, Ser. No. 706,298, Feb. 19, 1968. Application for reissue July 24, 1970, Ser. No. 57,993
Int. Cl. B65b *13/04*
U.S. Cl. 100—26 12 Claims

Matter enclosed in heavy brackets [ ] appears in the original patent but forms no part of this reissue specification; matter printed in italics indicates the additions made by reissue.

ABSTRACT OF THE DISCLOSURE

Booster mechanisms are disclosed to assist the push-feeding of flexible strap through strap chutes. Thin flexible strap of plastic or steel is fed through longer chutes by locating one or more boosters at spaced locations along the chute to subdivide the strap chute travel path into successive regions, each region being a substantial fraction of the total path. These different booster mechanisms are shown. In one form, a fixed motor drives a traction wheel that is nested within the chute and a cooperating idler wheel is mounted for movement between a feed position confronting the chute and a retracted position that allows clearance for stripping of the strap from the chute. In another form, a motor and a multilobed traction wheel are mounted for joint movement between a feed position wherein the traction wheel is in confronting relation to the chute and a clearance position. The multilobed wheel loads the strap directly against the chute and produces an intermittent feeding action tending to vibrate and shake the strap so as to reduce friction. In a third embodiment, a pair of power-driven traction wheels cooperate to drive the strap, these wheels being of rubber, to permit a certain amount of skidding against the strap when tending to overdrive the strap. The booster traction wheels operate at slightly greater speed than the feed rate of the strapping machine.

BACKGROUND OF THE INVENTION

This invention relates to strapping apparatus such as is employed at a strapping station for forming a loop of flexible strap about an object located at the station. Typically, the strapping station includes a chute defining a strap travel path encircling the object and the strapping apparatus includes strap infeed means adjacent the chute for pushing the strap through the chute to form a complete loop.

At present, it is quite difficult to push-feed the thinner sizes of plastic or steel strap through long strap chutes, or even through shorter chutes having sharp corners. The longer the chute and the more sharp turns therein, the greater the frictional resistance presented by the chute to movement of the strap as it is being pushed therethrough. Ultimately, the frictional resistance to the strap movement accumulates to a level tending to cause the strap to buckle locally within the chute, with each occurrence of buckling adding to the total resistance of the strap movement and aggravating the strap feed problem.

The strap feeding problem encountered in high resistance chute configurations is most pronounced in the case of the thinner sizes of nylon or polypropylene strap, for example, 0.015 to 0.020 inch, particularly where widths as small as ¼ inch are employed. Plastic strap in these sizes is notably subject to camber or curl leading to an exaggerated lateral wedging action of the strap edge against the chute wall so that an increased chute resistance effect results.

Where the strapping station is equipped with power driven strap feeding equipment conventionally operating at a uniform feed rate, the arrangement is more subject to buckling of the strap for a given chute configuration than is the case where manual strap feed is employed. In a manual feed operation, intermittent jiggling and shaking of the strap during push-feeding thereof tends to disrupt progressive accumulation of frictional resistance such as naturally arises in connection with the uniform feeding action of power equipment.

SUMMARY OF THE INVENTION

The present invention provides a booster mechanism for assisting lengthwise feed of the strap through the chute. The booster is associated with the chute for establishing push-feeding engagement with strap intermediately along the chute effectively to subdivide the total strap chute travel path into successive regions through which the strap is pushed first by the infeed means and then by the booster. Where longer chutes and higher resistance chute configurations are involved, the invention contemplates the use of additional boosters as needed, each subtending a chute region that represents a substantial fraction of the total strap chute travel path. In general, the boosters are located at the end of a straight chute section to assure feeding of the strap around the adjacent corner.

The booster mechanisms as disclosed herein operate at a strap feed rate slightly greater than that of the main infeed device.

Two booster embodiments disclosed herein are driven by a slip type drive system to adapt automatically to the strap supply condition at the particular region of the chute. In one of these embodiments, a motor-driven traction wheel is stationed within the chute to engage the strap from one surface and load it against an idler wheel that is mounted for movement between a feed position facing the strap chute and a retracted position to permit the strap to be stripped from the chute and drawn taut about the object. In the second embodiment, a single motor-driven traction wheel of a lobed configuration is mounted for movement between a feed position facing the chute and a retracted position.

A third embodiment utilizes a pair of rubber traction wheels, both power-driven, to permit a certain amount of skidding against the strap when there is a tendency to overdrive the strap.

The strap chute may be of a conventional type that includes spring-loaded side gates that control the strap during lengthwise travel and during stripping from the chute, the gates being modified at the booster region to provide access for the traction wheel.

Other features and advantages of the invention will be apparent from the following description and claims and are illustrated in the accompanying drawings which show structure embodying preferred features of the present invention and the principles thereof, and what is now considered to be the best mode in which to apply these principles.

DESCRIPTION OF THE DRAWINGS

In the accompanying drawings forming a part of the specification, and in which like numerals are employed to designate like parts throughout the same.

Figure 1:
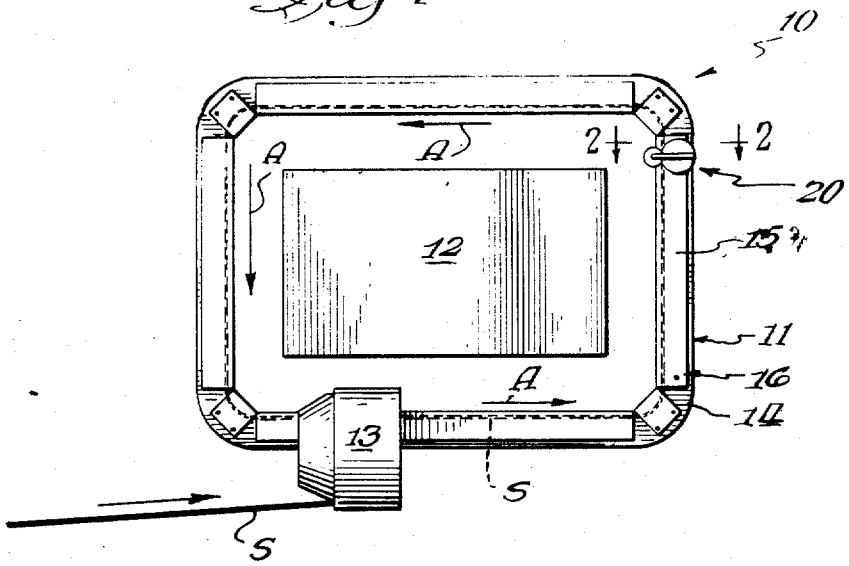
FIG. 1 is a diagrammatic front elevational view of a strapping station having a rectangular chute encircling an object supported at the station, the station being equipped with a power strapping head that push-feeds strap into and through the chute and a pair of boosters that are spaced along the chute to assist in push-feeding strap therethrough.
Figure 4:
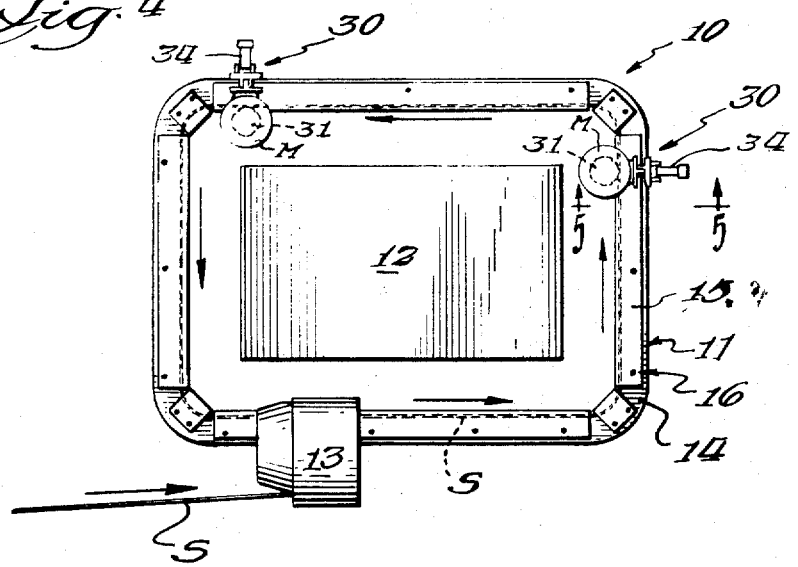
FIG. 4 is a diagrammatic view corresponding to that of FIG. 1 and showing a chute equipped with a pair of boosters.

Referring now to the drawings, typical power strapping stations are designated generally at 10 in FIGS. 1 and 4. Each strapping station 10 is illustrated diagrammatically as including a conventional strap feed chute 11 of rectangular configuration encircling an object 12 supported at the station in position to receive a loop of strap S.

A power strapping mechanism 13 of any conventional type is shown associated with an access region along the lower run of the chute 11 and, as is well known, the strapping mechanism 13 includes infeed means for pushing strap lengthwise through the chute in the direction indicates by the arrows A to form a complete loop about the object. Typically, a power strapping head such as any one of units of the Signode model M–20 series may be utilized for this purpose, the head also including a tensioning mechanism for taking up the slack loop to strip the strap from the chute and shrink the loop about the object and a sealing mechanism for securing the overlapping ends of the strap loop.

Figure 5:
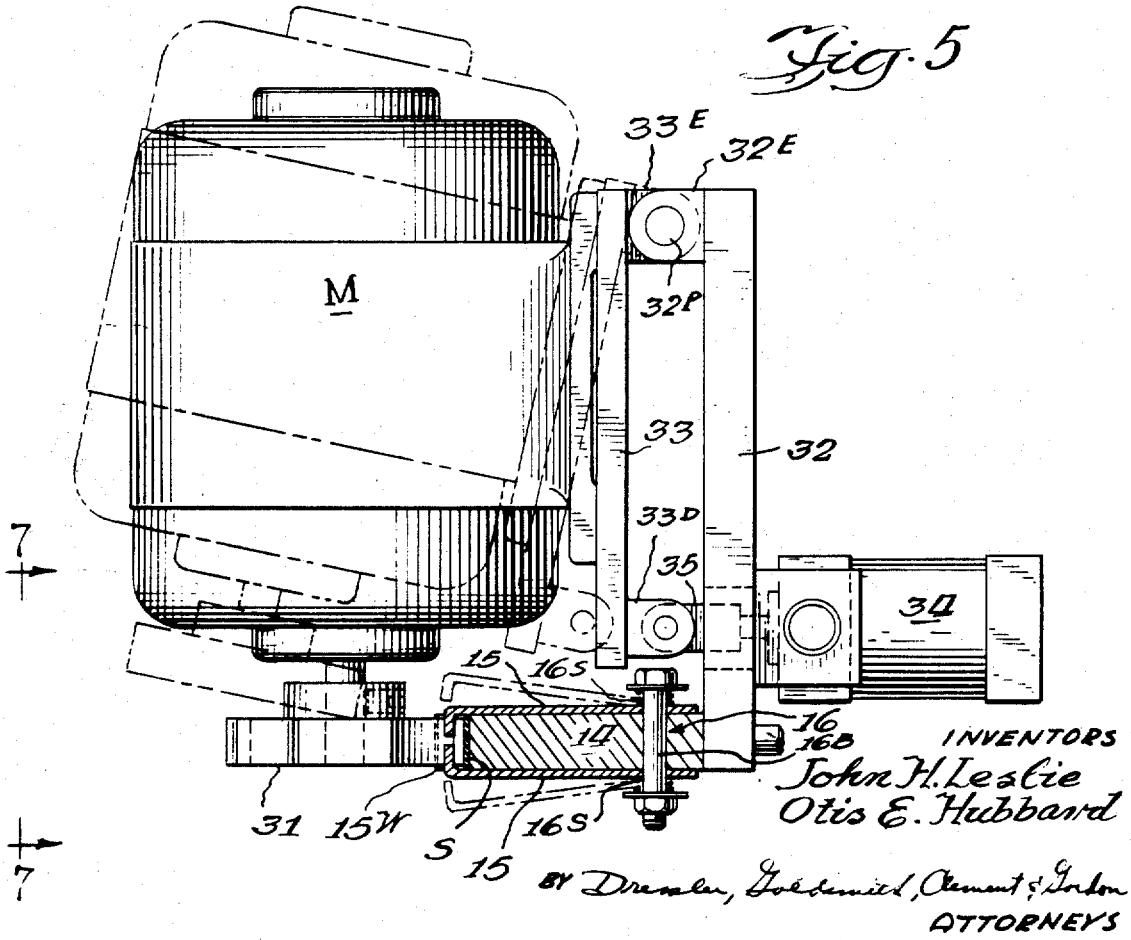
FIG. 5 is an enlarged fragmentary view taken as indicated on the line 5—5 of FIG. 4 and disclosing an alternative booster embodiment employing a single-lobed type traction wheel.
Figure 6:
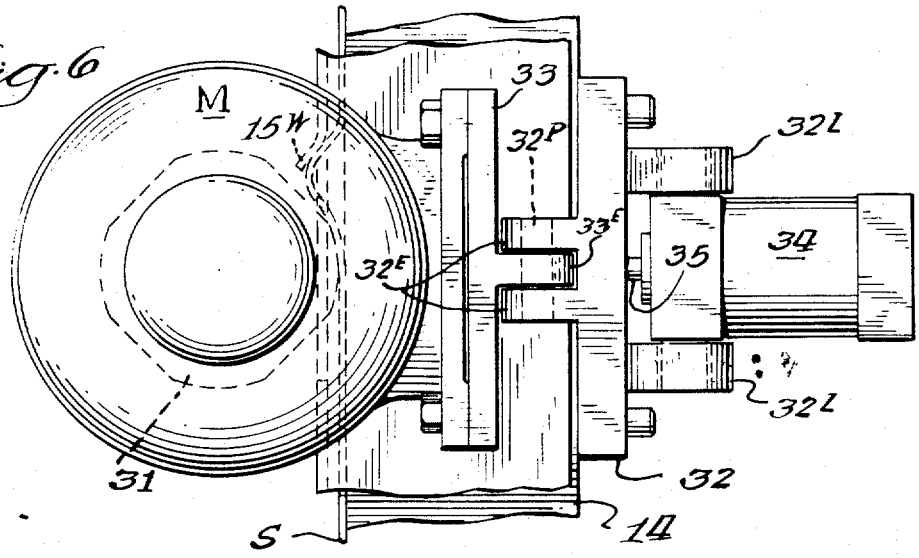
FIG. 6 is an end elevational view of the booster embodiment shown in FIG. 5.
Figure 7:
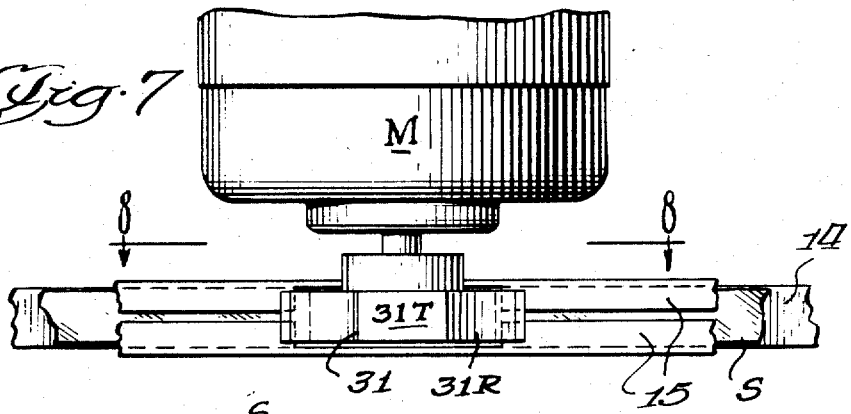
FIG. 7 is a fragmentary front elevational view taken as indicated on the line 7—7 of FIG. 5.
Figure 8:
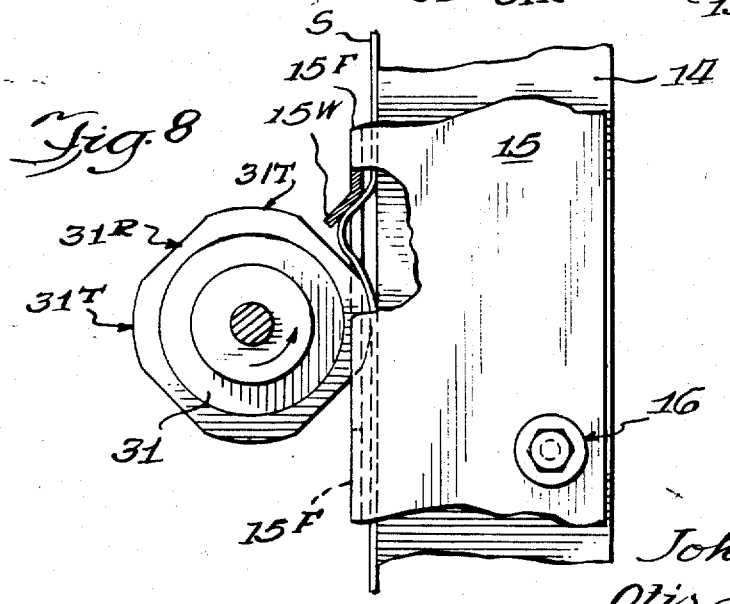
FIG. 8 is a fragmentary transverse section taken as indicated on the line 8—8 of FIG. 7.

The chute structures 11 may be of any conventional type and, as shown herein, are comprised of a back up element 14 flanked by successive pairs of angle-shaped side gates 15 mounted to the back up element by a plurality of spring-loaded bolt assemblies 16. Each mounting bolt assembly 16 typically includes a through bolt 16B and a pair of springs 16S acting between each end of the bolt and the corresponding side gate 15, as best shown in FIG. 5.

In conventional operation of the strapping equipment, the strap is push-fed lengthwise through the chute with the strap leading end returning to the power head 13 to complete a slack loop. The power head then draws tension on the slack loop to strip the strap from the chute and shrink it into tensioned relation about the object and thereafter the overlapping portion of the loop is sealed and the supply end cut to complete the operation.

As mentioned previously, in the case of chutes of longer sizes, or with sharp corner bends, particularly in strapping applications involving the handling of thin plastic strap subject to camber and curl, the accumulation of resistance to push-feeding of the strap can lead to buckling of the strap within the chute. In accordance with the present invention, buckling is avoided by subdividing the chute into successive regions, each of which has means for pushing the strap lengthwise therethrough. The chute arrangement shown in FIG. 1 is equipped with a single booster 20 for this purpose, this booster being of the type represented in FIGS. 2 and 3 and the chute arrangement shown in FIG. 4 is equipped with a pair of boosters 30, each being of the type shown in FIGS. 5 through 8. The boosters are located at the end of a straight chute section to insure feed of the strap around the succeeding corner.

A single booster is used for a short chute, two for an intermediate size chute and three for large chute systems.

Figure 2:
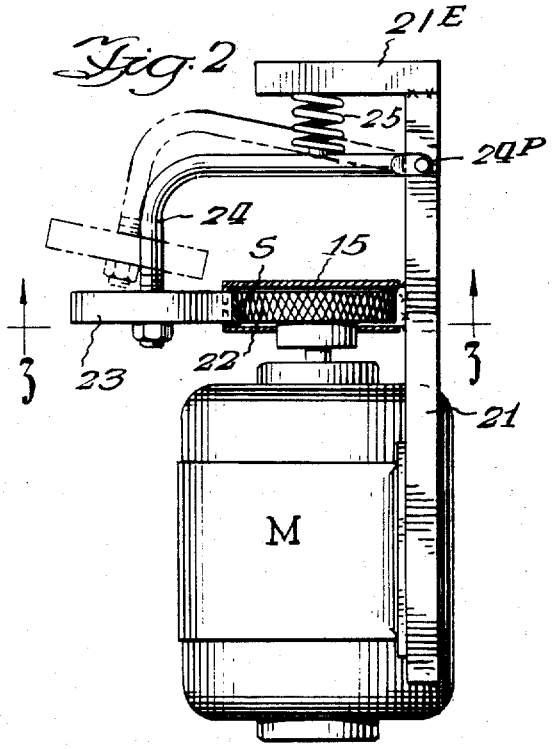
FIG. 2 is an enlarged fragmentary view taken approximately as indicated on the line 2—2 of FIG. 1 and disclosing a two-wheel embodiment of a booster in accordance with this invention.
Figure 3:
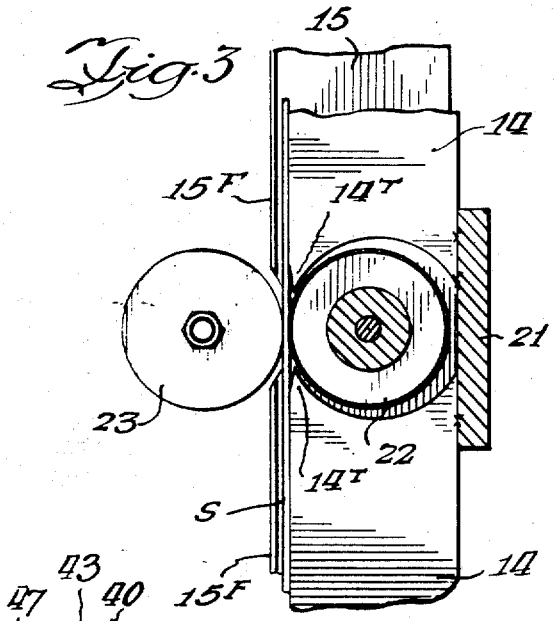
FIG. 3 is a transverse section through the booster and is taken as indicated on the lines 3—3 of FIG. 2.

The booster arrangement 20 shown in FIGS. 2 and 3 has a main mounting plate 21 secured to the chute and serves to support a fixed motor M that drives a traction wheel 22 nested within a generally circular cavity defined by an interrupted region in the back up element 14. An idler wheel 23 is mounted on a swing arm 24 to be movable between a feed position, as shown in full lines in FIG. 2, facing the strap chute in a retracted position, as shown in phantom lines in FIG. 2. In this retracted position, there is sufficient clearance to strip the strap from the chute onto the object 12. The swing arm 24 is pivoted on the mounting plate by a pivot pin 24P. The mounting plate 21 includes an end extension 21E serving as a rigid seat for a load spring 25 that normally reacts against the swing arm to bias it towards its feed position indicated by a full line where it holds the strap against the traction wheel 22.

In this embodiment, the strap in exiting from the strap chute contacts the idler wheel 23 and forceably swings it towards its retracted position. Any suitable control may be provided to energize the motor for operation only during the time that the strapping head 13 is in its strap feed cycle. As is best shown in FIG. 3, the guide flanges 15F on side gates 15 are interrupted to provide an access window for the idler wheel 23 which is to enter the chute sufficiently to press the strap S against the traction wheel. The side gate 15 on the motor side of the chute is interrupted as necessary to provide sufficient clearance for the side gate to swing open during stripping of the strap. The frame 14 is shown with tipped frontal portions 14T beveled slightly relative to the line of travel of the strap S through the booster station and arranged in close clearance to the traction wheel periphery to insure smooth snag-free passage of the lead end of the strap.

The provision of one or more boosters of this type at suitably spaced regions along the chute serves to subdivide the chute into shorter sections and prevents any accumulation of chute resistance great enough to cause buckling of the strap. As illustrated in FIG. 1, the strapping head 13 serves to feed the strap through an initial region amounting to almost one-half of the total chute travel path and the booster 20 handles the remainder. In other configurations, the strapping head 13 may account for a greater fraction of the total chute travel path than does the booster but, in either case, each feed mechanism works in series with the remainder and serves to feed strap over a substantial fraction of the total travel path.

The motor M is equipped with a slip clutch in its drive connection to the traction wheel 22 and is operated at a speed to provide a booster feed rate slightly greater than the feed rate of the strapping head. Slack buildup between the feed stations is thereby avoided, precluding one possible source of buckling and actually tending to increase the effective feed range of the strapping head.

The booster 30 shown in FIGS. 5 to 8 utilizes a single traction wheel 31 located to face the chute to load the strap S directly against the back up element 14. The traction wheel is of a multilobed type and in the embodiment disclosed herein has four symmetrically spaced arcuate traction surfaces 31T separated by relieved regions 31R. Only the traction surfaces 31T produce feeding of the strap so that the multilobed wheel provides an intermittent feeding action which serves to simultaneously shake and vibrate the strap, thereby overcoming any tendency to bind. Any number of lobes operating in accordance with the same principle can be provided on the traction wheel. In this form, the side gates 15 of the chute are interrupted only at their front flange portions 15F to provide an access window for the traction wheel to load the strap against the back up element 14. A mounting plate 32 is shown secured to the back up element 14 and extends laterally of the chute to provide a pair of offset mounting ears 32E that carry a pivot pin 32P for a mounting ear 33E on a swing bracket 33. The motor M has its base bolted directly to the swing bracket 33 so that in this embodiment, the motor M and the traction wheel 31 are movable between the feed position illustrated in full lines in FIG. 5 and the retracted position illustrated in phantom lines in FIG. 5. The position of the motor is controlled by a double-acting hydraulic cylinder 34 shown supported between flanking lug portions 32L on the rear of the mounting plate. The cylinder 34 has a piston rod 35 leading through the mounting plate and pivotally connected to a drive ear 33D on the swing bracket.

In this embodiment, the motor M runs continuously to drive the traction wheel 31 and the cylinder operation is timed by any suitable means (not shown) to hold the traction wheel in feed position during the time that the strapping head 13 is in its strap feed cycle and to move the traction wheel to its retracted position to accommodate stripping of the strap from the chute when the strapping head draws tension on the loop. The position control on the cylinder sets the traction wheel at a position wherein a permanent minimum clearance is maintained between the traction wheel periphery and the back up element 14. This clearance is slightly less than the strap thickness so that the traction wheel loads the strap against the back up element to effect lengthwise feeding of the strap through the chute. The motor M again includes a slip clutch drive and is operated at a speed to produce a feed rate that averages out to the feed rate of the strapping head. Thus, during the intervals when the arcuate traction regions 31T are engaging the strap, the strap is advanced more rapidly than it is being fed and a bulged region of strap tends to develop on the downstream side of the traction wheel. Then during the passage of the relieved lobe region 31R wherein no feeding occurs at the booster, the strap is paid out from the bulged slack to the next booster. The side gate flanges 15F are shown with oblique wing portions 15W to allow the slight bulging action without causing snagging or buckling.

Figure 9:
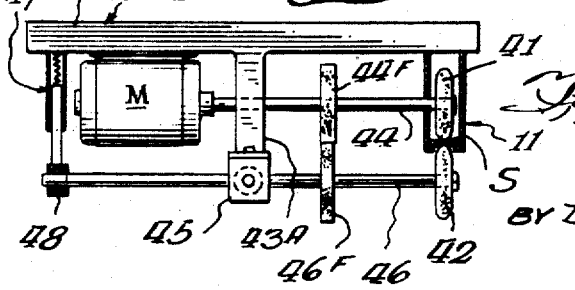
FIG. 9 is a fragmentary sectional view corresponding to the views of FIGS. 2 and 5 and showing a third embodiment utilizing a pair of power-driven rubber wheels.

Another booster embodiment 40 is shown in FIG. 9, wherein a pair of cooperating traction wheels 41, 42 are both power-driven to act against opposite faces of the strap S. A main mounting plate 43 secured to the chute 11 serves to support a fixedly mounted motor M. The traction wheel 41 is nested within a suitable cavity defined by an interrupted region in the chute and is powered by the drive shaft 44 of the motor M.

The mounting plate 43 is shown provided with a support arm 43A that carries a sleeve type pivot bearing 45 in which a companion drive shaft 46 is journaled. Mating friction drive wheels 44F and 46F are shown engaged intermediately along the shafts 44, 46 to drive the shaft 46 from the shaft 44. The traction wheel 42 is mounted on the drive shaft 46 to be swingable about the axis of the pivot bearing 45 for movement between a feed position, as shown in full lines in FIG. 9, and a retracted position (not shown) affording sufficient clearance to strip strap from the chute and onto the object being secured.

A compression spring mechanism 47 is carried by the mounting plate 43 and normally acts through a ring bearing 48 on the end of the shaft 46 to resiliently bias the same to the parallel position as illustrated wherein the friction wheels 44F, 46F are urged together more tightly than the loading of the traction wheels 41, 42. For this purpose, the traction wheels 41, 42 are of slighly less diameter than the friction wheels 44F, 46F and are of a rubber or rubber-like material to be capable of skidding movement relative to the strap. Correspondingly, the friction wheels are of an antiskid material.

The motor M is driven at a speed to rotate the traction wheels 41, 42 at a feed rate slightly greater than the feed rate of the strapping head. Slack buildup is thereby avoided, as stated previously, and in this embodiment the pair of powered traction wheels affect a more balanced feed action to the strap and yet allow a certain amount of skidding as determined by existing conditions of each application.

In the embodiment of FIG. 9, the motor M runs continuously to drive the traction wheel 41 at all times, while the spring mechanism 47 normally biases the shaft 46 to its illustrated position for driving the traction wheel 42 in synchronism. During stripping of the strap from the chute, the movement of the strap forcibly swings the traction wheel 42 out of its power-driven relationship and toward a retracted relation that allows the strap to pass around the wheel 42 and seat on the package.

What is claimed is:

1. In strapping apparatus for forming a loop of flexible strap about an object located at a strapping station that includes a chute defining a strap travel path encircling the object, said apparatus including main feed means adjacent an entry region of said chute for pushing strap lengthwise through said chute to form a slack loop, means for drawing tension on said slack loop to strip the strap from said chute and shrink the same about said object, and booster mechanism for assisting lengthwise feed of said strap and including at least one traction wheel mounted for push-feeding engagement with strap intermediately along said chute, *said traction wheel being mounted in interposed relation in said chute to engage a face of the strap in said chute, means mounting an idler wheel for movement between a feed position facing said traction wheel and a retracted position spaced therefrom to accommodate stripping of the strap from said chute through said feed position, said mounting means comprising a swing arm pivotable about an axis parallel to and offset from the plane of said chute and rotatably carrying said idler wheel and spring means yieldably biasing said spring arm in a direction to load said idler wheel towards said traction wheel for engaging the strap therebetween, and said booster mechanism having slip drive means normally operating said traction wheel at a strap feet rate slightly greater than the feed rate of said main feed means.*

2. In strapping apparatus in accordance with claim 1 wherein said chute has a rectangular configuration that includes elongated straight sections and corner sections and said booster mechanism is located along a straight section adjacent the downstream end thereof.

[3. In strapping apparatus in accordance with claim 1 and wherein said booster mechanism operates said traction wheel at a strap feed rate slightly greater than the feed rate of said main feed means.]

[4. In strapping apparatus in accordance with claim 1 wherein said booster mechanism has slip-type drive means normally operating said traction wheel at a strap feed rate slightly greater than the feed rate of said main feed means.]

[5. In strapping apparatus in accordance with claim 1 wherein said booster mechanism has said traction wheel mounted in interposed relation in said chute to engage a face of the strap in said chute, and includes means mounting an idler wheel for movement between a feed position facing said traction wheel and a retracted position spaced therefrom to accommodate stripping of the strap from said chute through said feed position.]

[6. In strapping apparatus in accordance with claim 5 wherein the last-named means comprises a swing arm pivotable about an axis parallel to and offset from the plane of said chute and rotatably carrying said idler wheel and spring means yieldably biasing said spring arm in a direction to load said idler wheel towards said traction wheel for engaging the strap therebetween.]

[7. In strapping apparatus in accordance with claim 5 wherein said booster mechanism has slip-type drive means normally operating said traction wheel at a feed rate slightly greater than the feed rate of said main feed means.]

[8. In strapping apparatus in accordance with claim 1 and wherein said booster mechanism includes means mounting said traction wheel for movement between a feed position facing the strap and a clearance position spaced therefrom to accommodate stripping of the strap from said chute through said feed position.]

9. In strapping apparatus [in accordance with claim 1 wherein] *for forming a loop of flexible strap about an object located at a strapping station that includes a chute defining a strap travel path encircling the object, said apparatus including main feed means adjacent an entry region of said chute for pushing strap lengthwise through said chute to form a slack loop, means for drawing tension on said slack loop to strip the strap from said chute and shrink the same about said object, and booster mechanism for assisting lengthwise feed of said strap and including at least one traction wheel mounted for push-feeding engagement with strap intermediately along said chute, said booster mechanism having slip drive means normally operating said traction wheel at a strap feed rate slightly greater than the feed rate, of said main feed means,* said traction wheel [is] *being* of multi-lobed configuration *and* having alternate traction regions and relieved regions to provide an intermittent feeding action tending to vibrate and shake the strap to reduce friction.

10. In strapping apparatus in accordance with claim 9 and wherein said booster mechanism includes means mounting said traction wheel for movement between a feed position facing said chute wherein said traction wheel has a position maintaining substantial contact against the strap and a clearance position spaced therefrom to accommodate stripping of the strap from said chute through said feed position.

[11. In strapping apparatus in accordance with claim 1 wherein said booster mechanism comprises a cooperating pair of power-driven traction wheels, one mounted in interposed relation in said chute and means mounting the other traction wheel for movement between a feed position facing the chute and a retracted position spaced therefrom to accommodate stripping of the strap from said chute through said feed position.]

12. In strapping apparatus [in accordance with claim 11 wherein the] *for forming a loop of flexible strap about an object located at a strapping station that includes a chute defining a strap travel path encircling the object, said apparatus including main feed means adjacent an entry region of said chute for pushing strap lengthwise through said chute to form a slack loop, means for drawing tension on said slack loop to strip the strap from said chute and shrink the same about said object, and booster mechanism for assisting lengthwise feed of said strap and including at least one traction wheel mounted for push-feeding engagement with strap intermediately along said chute, said booster mechanism having slip drive means normally operating said traction wheel at a strap feed rate slightly greater than the feed rate of said main feed means, said booster mechanism comprising a cooperating pair of power-driven traction wheels, one mounted in interposed relation in said chute and means mounting the other traction wheel for movement between a feed position facing the chute and a retracted position spaced therefrom to accommodate stripping of the strap from said chute through said feed position, said* last-named means includ[es]*ing* a shaft pivotable about an axis parallel to and offset from the plane of the chute carrying the other traction wheel in frictionally driven relation to the first traction wheel and spring means yieldably biasing said shaft in a direction to load said traction wheels against the strap.

13. In strapping apparatus in accordance with claim 12 wherein each of said traction wheels is of rubber-like material.

*14. In strapping apparatus for forming a loop of flexible strap about an object located at a strapping station that includes a chute defining a strap travel path encircling the object, said apparatus including main feed means adjacent an entry region of said chute for pushing strap lengthwise through said chute to form a slack loop, means for drawing tension on said slack loop to strip the strap from said chute and shrink the same about said object, booster mechanism for assisting lengthwise feed of said strap and including at least one traction wheel mounted for push-feeding engagement with strap intermediately along said chute, said traction wheel being of multi-lobed configuration having alternate traction regions and relieved regions to provide an intermittent feeding action tending to vibrate and shake the strap to reduce friction.*

*15. Strapping apparatus as claimed in claim 14 in which the chute has a rectangular configuration that includes straight sections and corner sections and the booster mechanism is located along a straight section adjacent the downstream end thereof.*

*16. Strapping apparatus as claimed in claim 14 or claim 15 in which the booster mechanism is arranged to operate the traction wheel at a strap feed rate slightly greater than the feed rate of the main feed means.*

*17. Strapping apparatus as claimed in claim 16 in which the traction wheel has a slip drive.*

*18. In strapping apparatus in accordance with claim 14 and wherein said booster mechanism includes means mounting said traction wheel for movement between a feed position facing the strap and a clearance position spaced therefrom to accommodate stripping of the strap from said chute through said feed position.*

*19. In strapping apparatus in accordance with claim 14 and wherein said booster mechanism includes means mounting said traction wheel for movement between a feed position facing said chute wherein said traction wheel has a position maintaining substantial contact against the strap and a clearance position spaced therefrom to accommodate stripping of the strap from said chute through said feed position.*

References Cited

The following references, cited by the Examiner, are of record in the patented file of this patent or the original patent.

UNITED STATES PATENTS

| | | | |
|---|---|---|---|
| 3,447,447 | 6/1969 | Rutty | 100—4 |
| 2,707,429 | 5/1955 | Leslie | 100—26 X |
| 2,968,982 | 1/1961 | Cousino | 226—113 X |
| 3,037,690 | 6/1962 | Tailleur | 226—113 X |
| 3,196,779 | 7/1965 | Embree | 100—26 X |

FOREIGN PATENTS

| | | | |
|---|---|---|---|
| 879,189 | 1961 | Great Britain | 100—26 |
| 910,167 | 1962 | Great Britain | 100—26 |

BILLY J. WILHITE, Primary Examiner